April 16, 1946.    R. A. TERRY    2,398,730

LITTER-CARRYING VEHICLE

Filed Jan. 16, 1945    2 Sheets-Sheet 1

INVENTOR.
REX A. TERRY
BY
ATTORNEY

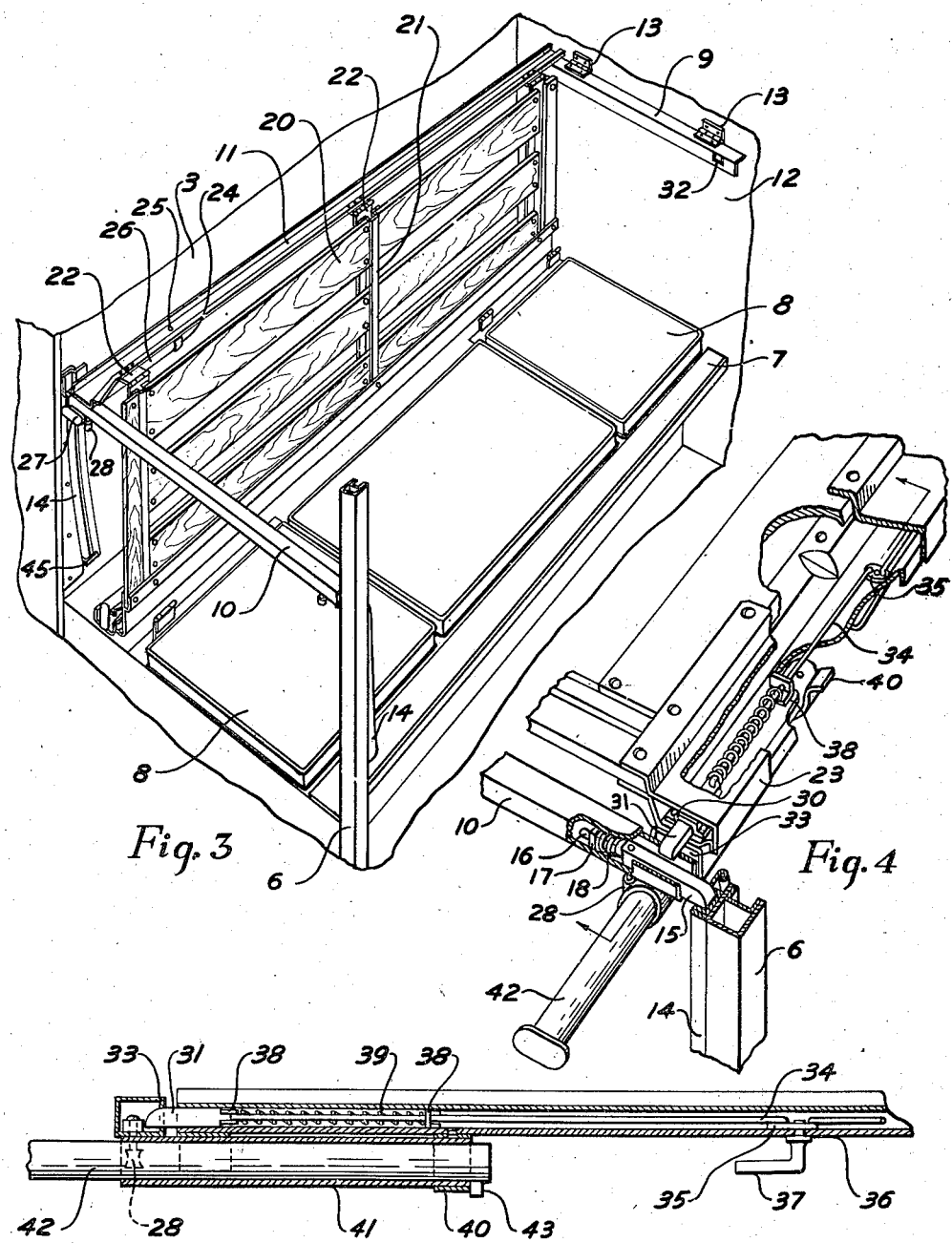

Patented Apr. 16, 1946

2,398,730

UNITED STATES PATENT OFFICE 2,398,730

LITTER-CARRYING VEHICLE

Rex A. Terry, Berkley, Mich., assignor to Chrysler Corporation, Highland Park, Mich., a corporation of Delaware Application January 16, 1945, Serial No. 573,046

8 Claims. (Cl. 296—19)

This invention relates generally to litter-carrying vehicles.

All vehicles of this character, made in accordance with the teachings of the prior art, and with which I am familiar, have been such that it has been very difficult to place a stretcher in a vehicle with a patient thereon without a great deal of trouble and many times serious injury to the patient. This has been especially true of vehicles designed for several different purposes including the carrying of litters.

It is, accordingly, an object of my invention to overcome the above and other defects in litter-carrying vehicles, and it is more particularly an object of my invention to provide a litter-carrying vehicle which is simple in construction, economical in cost, and efficient in operation.

Another object of my invention is to provide a litter-carrying vehicle with elevated litter-carriers which may be easily lowered for loading a litter on the carrier.

Another object of my invention is to provide a litter-carrying vehicle in which an elevated litter carrier disposed on each side of a vehicle is swingable downwardly against the side walls of the vehicle to form seat-backs, or otherwise to clear the interior of the vehicle to accommodate the passengers or cargo.

Another object of my invention is to provide a novel litter-carrying vehicle with novel quickly-attachable and detachable latch-means on an elevated litter carrier.

Other objects of my invention will become evident from the following detailed description, taken in conjunction with the accompanying drawings, in which:

Figure 3 is a perspective view showing the litter carrier in a downwardly swung position along the side of the vehicle;

Figure 4 is a perspective view of the latching means;

Figure 5 is a view taken on the line 5—5 of Figure 4.

Figure 1:
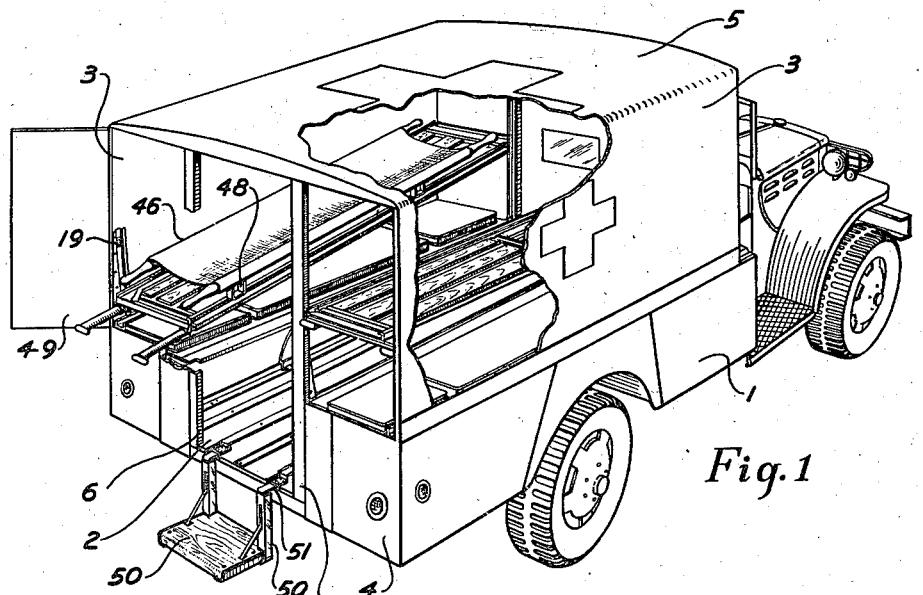
Figure 1 is a perspective view of my novel vehicle, with parts broken away for better illustration.
Figure 2:
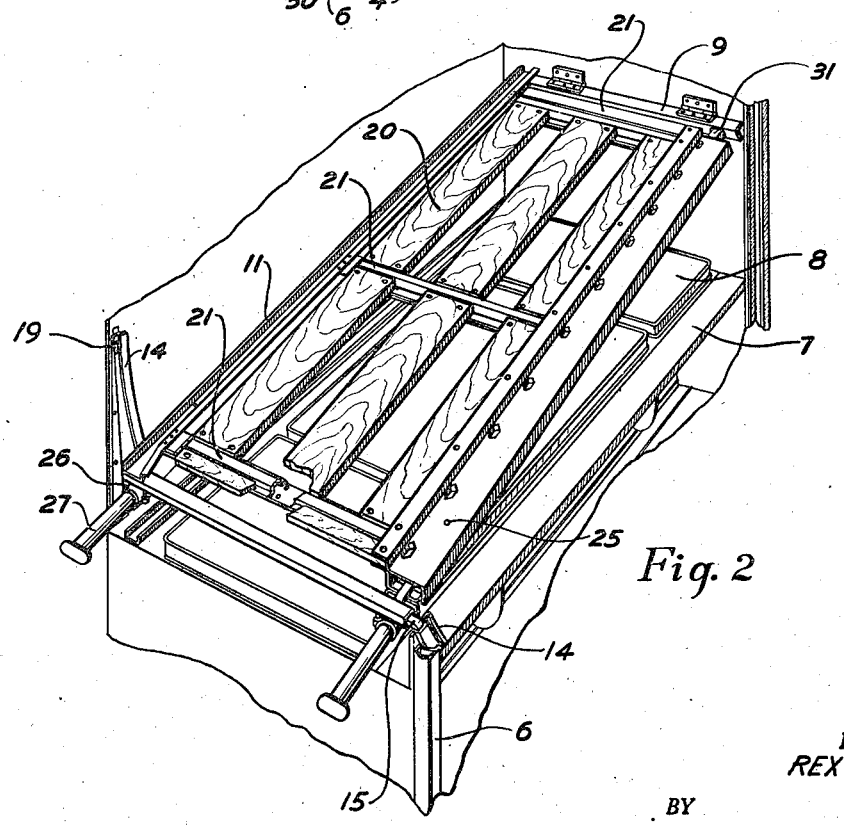
Figure 2 is a perspective view showing the elevated litter carrier in my novel vehicle in a lowered position.

Referring now to the drawings, Figures 1 and 2 show a motor vehicle 1 having a body which includes a floor 2, side walls 3, back-wall 4, and a top 5. The back-wall 4 has a central vertical opening or doorway defined by a pair of vertical posts 6 disposed between the floor 2 and the top 5.

A seat 7 is disposed along each side of the side-walls 3. Cushions 8 are preferably provided on the seat 7. Disposed above the seats 7, is a frame including a forward transverse member 9, a rear transverse member 10, and a longitudinal member 11 connecting the transverse members 9 and 10. The forward member 9 is mounted on the front wall 12 of the body of the vehicle 1 by hinges 13, swinging on a horizontal axis. Guide channels 14 are disposed on the side-wall 3 and post 6 curving downwardly and forwardly according to the radius determined by the length of the longitudinal member 11. Each end of the transverse member 10 has slidably mounted therein a spring-urged latch 15 carrying at its inner end a stem 16 slidable in an aperture bracket 17 fixed in the member 10. The stem 16 is surrounded by a spring 18 to urge the latch 15 outwardly. A bevelled support member 19 is provided on the upper portion of each guide member 14 over which each of the latch members 15 may be slid in its upward movement and finally come to rest thereon to support the longitudinal member 11 in a horizontal position.

I have illustrated the litter carrier by showing spaced wooden members 20 joined to transverse members 21. This structure is hinged by hinges 22 to the longitudinal member 11 and when it is hanging freely, it hangs downwardly as shown in Figure 3 to form a back for the seat 7. The marginal channel member 23 carries latching members at each end thereof as will presently be described.

The bottom of the fixed member 11 carries a yoke or clip 24 pivotally attached at 25. In the clip 24 is fixed one end of a rearwardly extending sleeve 26, having a handle 27 slidably mounted therein. Each of the latches 15 is provided with an operating finger 28 extending downwardly to the open bottom of the transverse member 10 to manually operate the latch 15.

The ends of the marginal member 23 carry guides 30, in each of which is mounted a longitudinally moving latch 31. Figure 4 shows a detailed view of this latch member 31 and its next parts. Only one of these structures is shown in detail inasmuch as both are identical. The latch 31 is adapted to engage an aperture 32 formed in the transverse member 9 and the latch 31 on the rear of the member 23 engages a similar slot 33 in the transverse member 10. Links 34 extend inwardly from the latches 31 and are pivotally attached to a toggle plate 35, which in turn is pivotally mounted on another channel 36 disposed in the channel 23. The pivotal mounting comprises an operating handle or crank 37 as shown in Figure 5, whereby the latches 31 may be retracted simultaneously from the apertures 32 and 33. The channel 36 carries a pair of apertured brackets 38 in which the links 34 are slidable. Between each bracket 38 and the adjacent latch 31, the link 34 is surrounded by a coil spring 39, which urges the latch 31 outwardly. The bottom of the channel 36 carries a pivotally mounted clip or yoke 40, similar to the member 24 and in which is fixed one end of a sleeve 41 similar to the sleeve 26. Sleeve 41 has slidably mounted therein a handle 42 with a stop-pin 43 at its inner end.

Figures 4 and 5 show the litter carrier in a horizontal position, the member 10 being supported on the stop members 19 and the latches 31 in engagement with the apertures 32 and 33.

When it is desired to place a litter on the litter carrier, the handles 27 and 42 are first pushed toward each other, thereby engaging the fingers 28 and retracting the latches 15. The litter carrier is then free to swing downwardly on the hinges 13 until the latches 15 engage stop members 45 at the lower ends of the guide channels 14. Stop members 45 are at such an elevation as to support the rear member 10 clear of the feet of a patient lying on the seat 8. A litter 46 is then slid on the tilted litter carrier. The litter 46 is preferably provided with feet 48 adapted to ride on the members 11 and 23. The litter carrier is then raised by means of force on the outwardly extending handles 27 and 42 until the spring-urged latches 15 again rest on top of the stop members 19. The handles 27 are then pushed inwardly to permit closing the rear door 49.

My novel litter carrier accommodates 4 litters and a fifth litter may be laid on the floor between the seats 7. A step 50 is hinged at 51 and provides a rear step for the vehicle.

Various changes may be made in the specific embodiment of my invention without departing from the spirit thereof, or from the scope of the appended claims.

What I claim is:

1. In a litter-carrying vehicle comprising a body for carrying a plurality of litters, the combination of a platform for supporting a litter, a frame cooperating with said platform for supporting the latter in different positions, said frame comprising a side member and transverse end members connected thereto, means for connecting said platform to said side member for oscillatory movement about an axis substantially parallel to said side member, means for supporting one of said end members for oscillatory movement about a substantially fixed horizontal axis substantially parallel thereto, selectively operable means for supporting the other of said end members at substantially the same elevation as said substantially fixed horizontal axis and at a lower elevation, and releasable means for supporting the side of said platform remote from said side member from said end members.

2. In a litter-carrying vehicle comprising a body for carrying a plurality of litters, the combination of a platform for supporting a litter, a frame cooperating with said platform for supporting the latter in different positions, said frame comprising a side member and transverse end members connected thereto, means for connecting said platform to said side member for oscillatory movement about an axis substantially parallel to said side member, means for supporting one of said end members for oscillatory movement about a substantially fixed horizontal axis substantially parallel thereto, selectively operable means for supporting the other of said end members at substantially the same elevation as said substantially fixed horizontal axis and at a different elevation to incline the platform lengthwise, and releasable means for supporting the side of said platform remote from said side member from said end members.

3. In a litter-carrying vehicle comprising a body for carrying a plurality of litters, the combination of a platform for supporting a litter, a frame cooperating with said platform for supporting the latter in different positions, said frame comprising a side member and transverse end members connected thereto, means for connecting said platform to said side member for oscillatory movement about an axis substantially parallel to said side member, means for supporting one of said end members for oscillatory movement about a substantially fixed horizontal axis substantially parallel thereto, selectively operable means for supporting the other of said end members at substantially the same elevation as said substantially fixed horizontal axis and at a lower elevation, means for guiding said other of said end members for movement between said elevations, and releasable means for supporting the side of said platform remote from said side member from said end members.

4. In a litter-carrying vehicle comprising a body for carrying a plurality of litters, the combination of a platform for supporting a litter, a frame cooperating with said platform for supporting the latter in different positions, said frame comprising a side member and transverse end members connected thereto, means for connecting said platform to said side member for oscillatory movement about an axis substantially parallel to said side member, means for supporting one of said end members for oscillatory movement about a substantially fixed horizontal axis substantially parallel thereto, selectively operable means for supporting the other of said end members at substantially the same elevation as said substantially fixed horizontal axis and at a lower elevation, spring pressed latches for supporting the side of said platform remote from said side member from said end members, and a common operating means for withdrawing said latches.

5. In a litter-carrying vehicle comprising a body for carrying a plurality of litters, the combination of a platform for supporting a litter, a frame cooperating with said platform for supporting the latter in different positions, said frame comprising a side member and transverse end members connected thereto, means for connecting said platform to said side member for oscillatory movement about an axis substantially parallel to said side member, means for supporting one of said end members for oscillatory movement about a substantially fixed horizontal axis substantially parallel thereto, selectively operable means for supporting the other of said end members at substantially the same elevation as said substantially fixed horizontal axis and at a lower elevation, and releasable means for holding said platform from movement about said first-mentioned axis.

6. In a litter-carrying vehicle comprising a body for carrying a plurality of litters, the combination of a platform for supporting a litter, a frame cooperating with said platform for supporting the latter in different positions, said frame comprising a side member and transverse end members connected thereto, means for connecting said platform to said side member for oscillatory movement about an axis substantially parallel to said side member, means for supporting one of said end members for oscillatory movement about a substantially fixed horizontal axis substantially parallel thereto, retractable latches for supporting the other of said end members at substantially the same elevation as said substantially fixed horizontal axis and at a different elevation for tilting said platform lengthwise, and releasable means for holding said platform from movement about said first-mentioned axis.

7. In a litter-carrying vehicle of the class described, the combination of a platform for supporting a litter, a frame cooperating with said platform for supporting the latter in different positions, said frame comprising a side member and transverse end members connected thereto, means for supporting said platform for oscillatory movement about an axis substantially parallel to said side member and substantially fixed relative thereto, means for supporting one of said end members for oscillatory movement about a substantially horizontal axis extending longitudinally thereof and fixed relative to the vehicle, selectively operable means for supporting the other of said end members at substantially the same elevation as the latter axis and at a different elevation for tilting the platform for loading and unloading, and releasable means for holding said platform from movement about said first-mentioned axis.

8. In a litter-carrying vehicle of the class described, the combination of a platform for supporting a litter, a frame cooperating with said platform for supporting the latter in different positions, said frame comprising a side member and transverse end members connected thereto, means for supporting said platform for oscillatory movement about an axis substantially parallel to said side member and substantially fixed relative thereto, means for supporting one of said end members for oscillatory movement about a substantially horizontal axis extending longitudinally thereof and fixed relative to the vehicle, selectively operable means for supporting the other of said end members at substantially the same elevation as the latter axis and at a different elevation for tilting the platform for loading and unloading, extensible handles carried by the platform for extension beyond said other of said end members to facilitate moving the platform between said elevations, and releasable means for holding said platform from movement about said first-mentioned axis.

REX A. TERRY.